Nov. 10, 1953  R. G. COLLISON  2,658,868
OZONE GENERATOR
Filed June 15, 1951

INVENTOR.
Roy G. Collison.
BY Wilfred E. Lowson
ATTORNEY.

Patented Nov. 10, 1953

2,658,868

UNITED STATES PATENT OFFICE 2,658,868

OZONE GENERATOR

Roy G. Collison, Los Angeles, Calif.

Application June 15, 1951, Serial No. 231,853

1 Claim. (Cl. 204—320)

This invention relates to gas and air chemistry and more especially to the formulation of ozone.

An object of the invention is to provide a simple, practical and efficient machine or apparatus for the production of ozone.

Another object of the invention is to provide novel improvements in an ozone generator which is compact and readily movable to a conveniently located place for the utilization of the generated ozone.

An additional object of the invention is to provide in an ozone generator novel automatic features.

Other objects and advantages will appear and be brought out more fully in the following specification, reference being had to the accompanying drawing.

Figure 1:
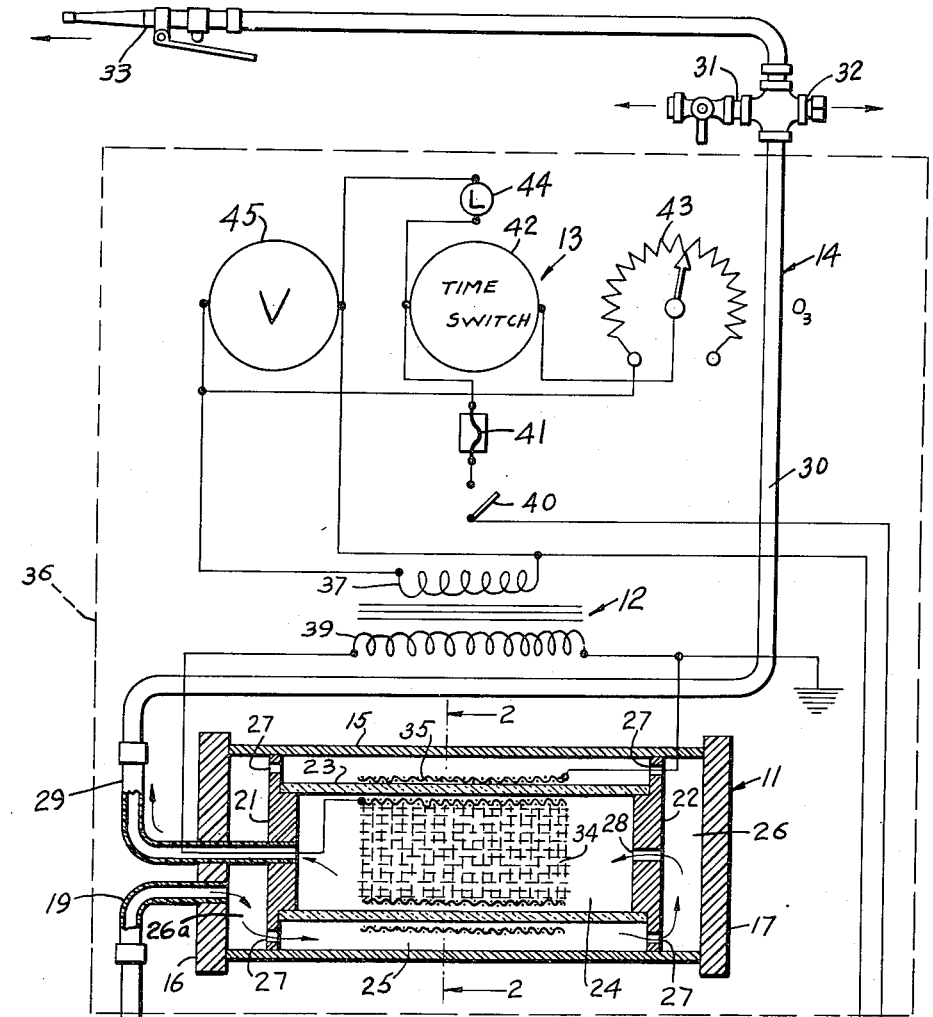
Figure 1 is a view in central section of an ozone generator embodying the invention, together with associated piping and the diagram of the electrical circuit associated therewith.
Figure 2:
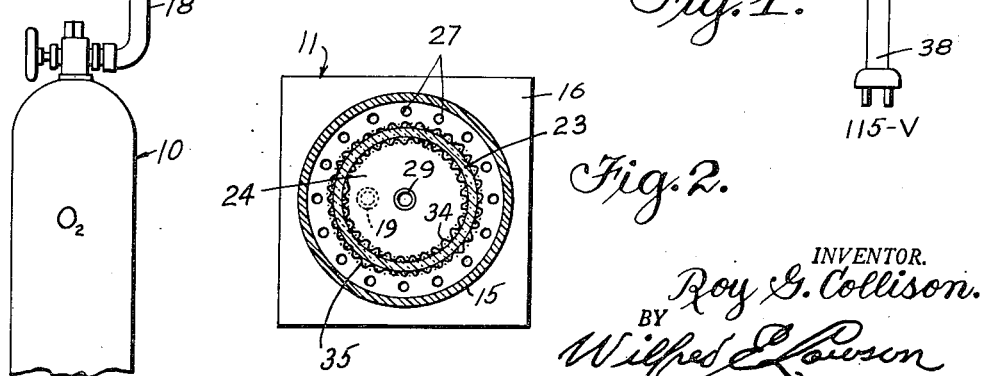
Figure 2 is a sectional view taken along the line 2—2 of Figure 1.

Referring more particularly to the drawing, the ozone generator of the present invention comprises several related parts and includes a source of oxygen 10, the generator 11, a transformer 12 and a control circuit 13 for the transformer and generator and a piping system 14 for the oxygen $O_2$ and the generated ozone, the chemical abbreviation of which is $O_3$.

Generator 11 comprises a gas chamber or container consisting of a cylindrical wall 15 and a pair of end walls 16 and 17 which are preferably, although not necessarily, made of a suitable plastic material. A valved pipe 18 is connected to oxygen tank 10 and to a pipe section 19 which extends through wall 16 and provides an oxygen inlet for generator 11.

A pair of circular walls 21 and 22 are suitably supported within the generator and together with a cylindrical wall 23 provide an inner chamber 24 within the generator. Wall 23 is seen to form a long annular chamber 25 and end wall 22 is seen to form an end chamber 26 adjacent end wall 17 of the generator while the opposite wall 21 forms with the adjacent wall 16, an end chamber 26a. Walls 21 and 22 are formed with a plurality of apertures 27 and wall 22 is formed with an aperture 28, which apertures, together with chambers 25, 26 and 26a, provide a duct system for the admission of oxygen from pipe 19 into the interior of chamber 24.

A pipe section 29 extends through walls 16 and 21 and provides a discharge outlet for the ozone generated in chambers 24 and 25 of the generator. Suitable piping 30 having branches 31 and 32, valved if desired as shown, and a valved nozzle 33 comprise a typical utilization system for the generated ozone.

A pair of electrodes 34 and 35 are positioned on opposite sides of wall 23 of the inner chamber and are preferably constituted of concentrically disposed wire screens. Wall 23 is preferably of glass or other material having properties similar to glass.

The generator 11 is preferably mounted upon a suitable base 36 or within a suitable casing, the base or casing providing a mounting for transformer 12 and the control circuit 13. Transformer 12 has a primary winding 37 connected to a source of electrical alternating current power 38 and has a secondary winding 39, the ends of which are connected respectively to electrodes 34 and 35. The controlling circuit includes a main switch 40, fuse 41, a timing switch 42, rheostats 43, pilot lamp 44 and voltmeter 45.

In the operation of the invention, oxygen supplied under pressure from tank 10 is conducted into the chamber 26a and passes to and through chamber 24 and upon the operation of the electrical system an interaction occurs between electrodes 34 and 35 of such nature that the oxygen $O_2$ molecules are broken down and reformed into $O_3$ molecules which is the ozone desired. The ozone is conducted into the pipe system 14 for delivery and use where desired.

While in the foregoing there has been shown and described the preferred form of this invention, it is to be understood that minor changes in the details of construction, combination and arrangement of parts may be resorted to without departing from the spirit and scope of the invention as claimed.

I claim:

An ozone generator, comprising an elongate hollow body wall having a closure wall at each end, partitioning walls within said body wall and in peripheral contact therewith and in spaced relation with the end walls to form end chambers, a conduit opening into one of said end chambers for the admission of oxygen thereinto from a source of supply, a cylinder of dielectric material disposed between and secured at its ends to the confronting faces of said partitioning walls and spaced from said body wall to form an elongate annular chamber between said partitioning walls, said partitioning walls having apertures therethrough establishing communication between the annular chamber and said end chambers, the said partitioning wall remote from the said one of said end chambers having an aperture leading from the adjacent end chamber into said cylinder, an ozone lead-off conduit leading to the outside of the generator from the interior of said cylinder at the end of the cylinder remote from the last named aperture, a metal fabric electrode within said annular chamber and surrounding the cylinder, a cylindrical metal fabric electrode within said cylinder in close proximity to the wall thereof, and an electric current conductor connected to each of said electrodes for connection to a source of electric potential.

ROY G. COLLISON.

References Cited in the file of this patent

UNITED STATES PATENTS

| Number | Name | Date |
|---|---|---|
| 909,309 | Kolle | Jan. 12, 1909 |
| 1,010,777 | Leggett | Dec. 5, 1911 |
| 1,312,484 | Knox et al. | Aug. 5, 1919 |
| 1,874,455 | Conley | Aug. 30, 1932 |